United States Patent [19]

Boffito et al.

[11] Patent Number: 5,961,750
[45] Date of Patent: Oct. 5, 1999

[54] NONEVAPORABLE GETTER ALLOYS

[75] Inventors: Claudio Boffito, Rho; Alessio Corazza, Como; Stefano Tominetti, Milan, all of Italy

[73] Assignee: SAES Getters, S.p.A., Lainate, Italy

[21] Appl. No.: 09/054,337

[22] Filed: Apr. 2, 1998

[30] Foreign Application Priority Data

Apr. 3, 1997 [IT] Italy .................................. MI97A0769

[51] Int. Cl.⁶ ........................... C22C 30/00; C22C 16/00
[52] U.S. Cl. ........................... 148/442; 55/522; 148/421; 420/422; 252/181.6
[58] Field of Search .................................. 148/442, 421; 420/422; 55/522, 523; 252/181.6

[56] References Cited

U.S. PATENT DOCUMENTS

| | | |
|---|---|---|
| 3,203,901 | 8/1965 | della Porta ........................... 252/181.6 |
| 4,071,335 | 1/1978 | Barosi . |
| 4,306,887 | 12/1981 | Barosi et al. . |
| 4,312,669 | 1/1982 | Boffito et al. . |
| 4,668,424 | 5/1987 | Sandrock . |
| 5,294,422 | 3/1994 | Kitahara et al. . |
| 5,543,687 | 8/1996 | Woyke et al. . |
| 5,750,026 | 5/1998 | Gadkaree et al. .................... 210/502.1 |

FOREIGN PATENT DOCUMENTS

| | | |
|---|---|---|
| 1320336 | 7/1993 | Canada . |
| 5-4809 | 1/1993 | Japan . |
| 6-135707 | 5/1994 | Japan . |
| 7-242401 | 9/1995 | Japan . |
| 2 077 487 | 12/1981 | United Kingdom . |
| WO 96/13620 | 5/1996 | WIPO . |

Primary Examiner—John Sheehan
Attorney, Agent, or Firm—Hickman Stephens & Coleman, LLP

[57] ABSTRACT

Nonevaporable getter alloys containing Zr, Co, and a third component A selected from the rare each metals and mixtures thereof, e.g., mischmetal. A most preferred alloy contains about 80.8 wt % Zr, about 14.2 wt % Co, and about 5 wt % A. These alloys are advantageous because they are suitable for general use, i.e., they have a relatively low activation temperature, are capable of sorbing a wide variety of gases, and minimize the environmental and safety risks associated with known nonevaporable getter alloys.

22 Claims, 7 Drawing Sheets

NONEVAPORABLE GETTER ALLOYS

CLAIM FOR PRIORITY

This patent application claims priority under 35 U.S.C. § 119 from Italian Patent Application Serial No. MI9A 000769, filed Apr. 3, 1997, which is incorporated herein by reference for all purposes.

BACKGROUND OF THE INVENTION

The present invention relates generally to nonevaporable getter alloys and, more particularly, to nonevaporable getter alloys formulated for general applicability without significant environmental or safety risks.

Nonevaporable getter alloys, which are sometimes referred to as "NEG alloys," are capable of reversibly sorbing hydrogen and irreversibly sorbing gases such as oxygen, water vapor, cart on oxides, and, in the case of some NEG alloys, nitrogen. Accordingly, NEG alloys ire frequently used to maintain a vacuum for thermal insulation, e.g., inside the evacuated cavities of thermos bottles, Dewar bottles, or pipes for transporting petroleum in arctic regions. NEG alloys also may be used to remove the aforementioned gases from gaseous atmospheres formed, e.g., of noble gases. For example, NEG alloys are used in lamps, particularly fluorescent lamps, to keep the atmosphere suitable for operation of the lamp. Further, NEG alloys may be used to purify inert gases by removing the aforementioned gases therefrom. In this case, the purification may be carried out either before the use of the purified gas or inside the same chamber where the purified gas is to be used, e.g., in the production of semiconductors as disclose in International Publication No. WO 96/13620 in the name of SAES Pure Gas, Inc. of San Luis Obispo, Calif., the disclosure of which is hereby incorporated by reference. In general, NEG alloys have zirconium and/or titanium as a main component and may include one or more elements selected from among the transition metals and aluminum.

NEG alloys are known in the art and the subject of several patents. U.S. Pat. No. 3,203,901 to della Porta discloses Zr—Al alloys and, in particular, an alloy having a composition of 84 wt % Zr and 16 wt % Al. This alloy is manufactured and sold by SAES Getters S.p.A. of Milan, Italy, the assignee of the present application, under the trade name St 101®. U.S. Pat. No. 4,071,335 to Barosi discloses Zr—Ni alloys and, in particular, an alloy having a composition of 75.7 wt % Zr and 24.3 wt % Ni. This alloy is manufactured and sold by SAES Getters S.p.A. of Milan, Italy, the assignee of the present application, under the trade name St 199™. U.S. Pat. No. 4,306,887 to Barosi et al. discloses Zr—Fe alloys and, in particular, an alloy having a composition of 76.6 wt % Zr and 23.4 wt % Fe. This alloy is manufactured and sold by SAES Getters S.p.A. of Milan, Italy, the assignee of the present application, under the trade name St 198™. Certain properties f these materials generally limit their use to some very specific applications. For example, the St 101® alloy has an activation temperature of about 900° C. and therefore is used when the device in which the alloy is disposed can withstand high temperatures, whereas the St 198™ alloy has only a limited nitrogen sorption.

Materials similar to those disclosed in the above-described patents have even more specific applications. For example, Canadian Patent No. 1,320,336 discloses the use of the intermetallic compound ZrCo as a means for reversibly storing hydrogen because it has a high equilibrium pressure with respect to this gas and its isotopes. U.S. Pat. No. 4,668,424 to Sandrock discloses zirconium-nickel-mischmetal alloys which may include one or more other metals such as cobalt. The use of these alloys, however, is limited to the reversible sorption of hydrogen and its isotopes.

For the above-described reasons, the aforementioned alloys may be defined as alloys of specific use, and are often described and referred to in patents and technical or commercial bulletins with reference to their use in specific applications.

On the other hand, there are alloys having relatively low activation temperatures and good sorption properties for a wide variety of gases. Alloys having these functional characteristics are especially useful because they may be used in a wide range of conditions and thus in a number of different applications. These alloys may be defined as alloys of general use and will be referred to herein as such. Among the alloys of general use, the most widely used is an alloy having a composition of 70 wt % Zr, 24.6 wt % V, and 5.4 wt % Fe and an activation temperature ranging from about 350° C. to about 500° C., which is relatively low relative to the activation temperature of other getter materials. This alloy, which is disclosed in U.S. Pat. No. 4,312,669 to Boffito et al., is manufactured and sold by SAES Getters S.p.A. of Milan, Italy, the assignee of the present application, under the trade name St 707™. The St 707™ alloy, however, has the drawback of containing vanadium, the compounds of which are toxic, particularly the oxides. Vanadium is contained in many alloys used for purifying inert gases, e.g., as disclosed in Japanese Laid-Open Patent Application (Kokai) Nos. 5-4809, 6-135707, and 7-242401.

One disadvantage of some known NEG alloys is that they may give rise to strongly exothermic reactions when contacted with large amounts of reactive gases, e.g., being exposed to air. Such exothermic reactions, which are more prone to occur when the alloy is heated to a temperature of at least about 200° C. to about 250° C., may produce temperatures above 1000° C. thereby endangering the safety of nearby workers. In many applications, these NEG alloys are contained in stainless steel vessels the walls of which may melt at temperatures above 1000° C. due to the formation of a eutectic co position between the NEG alloy and the vessel wall. Melting of the vessel wall n lay result in leakage of the NEG alloy at high temperature which may cause substantial damage to the surrounding environment.

NEG alloys may be inadvertently exposed to large amounts of reactive gases in a number of ways. For (example, the device containing the NEG alloy may be accidentally broken or an operator may inadvertently introduce high impurity gas, e.g., air, into the device. In the past, such events have occurred in semiconductor plants in connection with the purification of inert gases. The medium- and large-sized gas purifiers used in semiconductor plants contain large amounts of NEG alloys which are typically kept at operating temperatures of about 400° C. In the event air or another reactive gas accidentally enters the purifier, such conditions promote a violent reaction between the impurities in the gas and the NEG alloy which, as mentioned above, may result in catastrophic failure of the walls of the purifier vessel and endanger those nearby the purifier. Accordingly, the use of known NEG alloys in gas purifiers presents a substantial safety risk. In addition, when the NEG alloy is the St 707™ alloy or one of the alloys disclosed in the aforementioned Japanese patent applications, a substantial environmental risk is presented because toxic or harmful species such as, for example, vanadium oxide, may be formed and dispersed in the environment.

In view of the foregoing, there is a need for nonevaporable getter alloys which are suitable for general use without presenting significant safety or environmental risks.

SUMMARY OF THE INVENTION

Broadly speaking, the invention fills this need by providing nonevaporable getter alloys which contain zirconium, cobalt, and a third component selected from among rare earth metals and mixtures of rare earth metals. The invention also provides getter devices including the nonevaporable getter alloys of the invention.

The nonevaporable getter alloys of the invention preferably have a composition, in terms of weight percentage, which when plotted on a ternary composition diagram falls within a polygon defined by the points a) 81 wt % Zr, 9 wt % Co, and 10 wt % A, b) 68 % Zr, 22 wt % Co, and 10 wt % A, c) 74 wt % Zr, 24 wt % Co, and 2 wt % A, and d) 88 wt % Zr, 10 wt % Co, and 2 wt % A, where A is selected from the group consisting of rare earth metals and mixtures thereof.

In a more preferred embodiment, the nonevaporable getter alloy contains about 5 wt % of the component A, which is preferably yttrium, lanthanum, or a mixture thereof, e.g., mischmetal. In a most preferred embodiment, the nonevaporable getter alloy has a composition of bout 80.8 wt % Zr, about 14.2 wt % Co, and about 5 wt % A.

The nonevaporable getter alloys of the invention may be used to form getter devices. To form such devices, the nonevaporable getter alloys are preferably provided in the form of a powder having a particle size smaller than 250 μm. In a preferred embodiment, the powder has a particle size in a range of from about 40 μm to about 125 μm.

The nonevaporable getter alloys of the invention are advantageous because they are suitable for general use, i.e., they have a relatively low activation temperature, are capable of sorbing a wide variety of gases, and minimize the environmental and safety risks associated with known nonevaporable getter alloys.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE PREFERRED EMBODIMENTS

Reference will now be made to the present preferred embodiments of the invention, examples of which are illustrated in the accompanying drawings.

Figure 1:
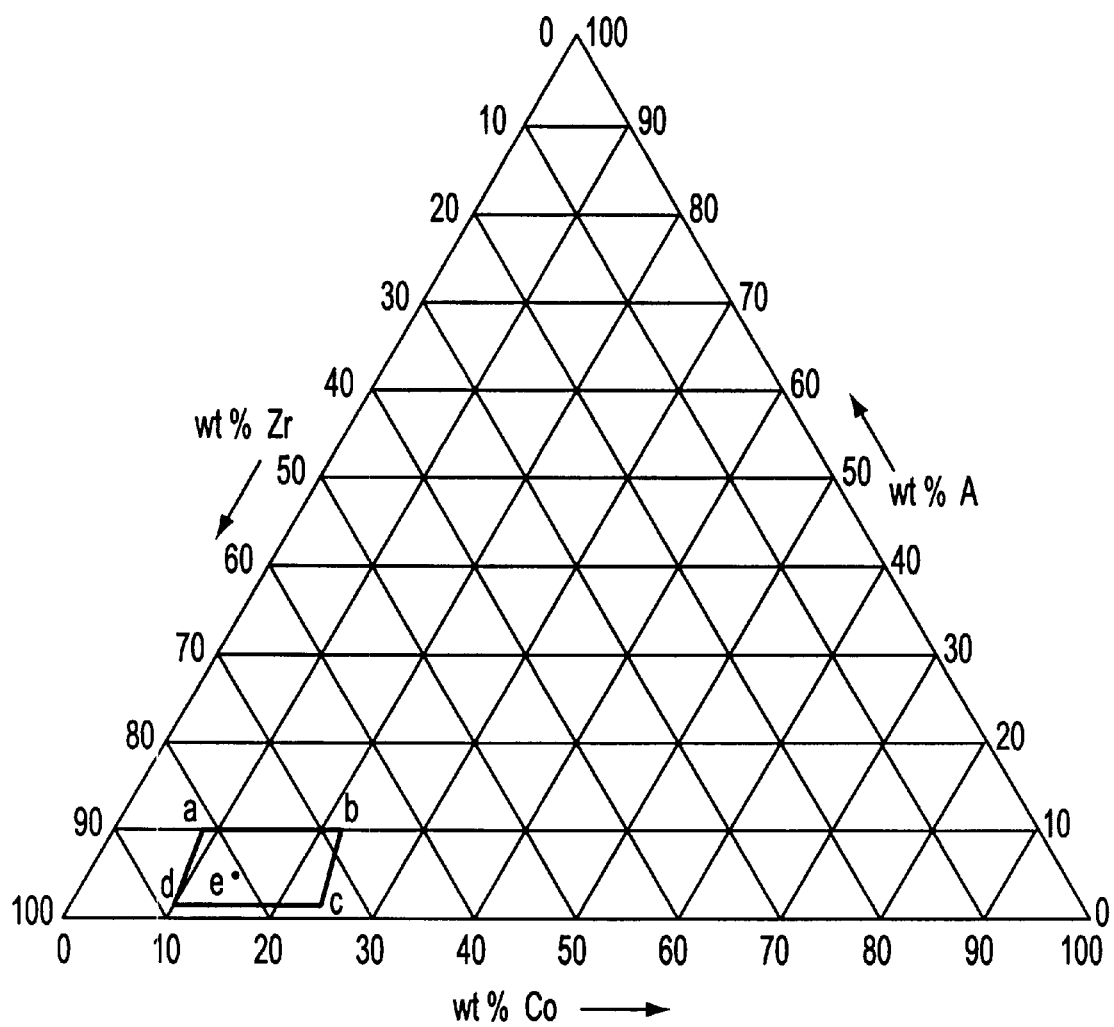
FIG. 1 is a ternary composition diagram showing the preferred range of compositions of the NEG alloys of the invention.

FIG. 1 is a ternary composition diagram showing the preferred range of compositions of the NEG alloys of the invention. The preferred compositions fall within a polygon defined by points (a), (b), (c), and (d) as shown in FIG. 1. Point (a) indicates a composition of 81 wt % Zr, 9 wt % Co, and 10 wt % A. Point (b) indicates a composition of 68 wt % Zr, 22 wt % Co, and 10 wt % A. Point (c) indicates a composition of 74 wt % Zr, 24 wt % Co, and 2 wt % A. Point (d) indicates a composition of 88 wt % Zr, 10 wt % Co, and 2 wt % A. In each of the compositions indicated by points (a)–(d), "A" is a rare earth metal or a mixture of rare earth metals. As used in connection with the description of the invention, the term "rare earth metal" includes Y, La, Ce, Pr, Nd, Pm, Sm, Eu, Gd, Tb, Dy, Ho, Er, Tm, Yb, and Lu.

More preferred compositions of the NEG alloys of the invention include about 5 wt % A. A most preferred NEG alloy of the invention includes about 80.8 wt % Zr, about 14.2 wt % Co, and about 5 wt % A. This most preferred composition is indicated by point (e) in the ternary composition diagram of FIG. 1.

It has been found that the use of mischmetal as the third component A is advantageous in the NEG alloys of the invention. As used in the connection with the description of the invention, the term "mischmetal" refers to a mixture of rare earth metals which includes cerium, lanthanum, and neodymium. By way of example, one mischmetal suitable for use in the NEG alloys of the invention includes 50 wt % Ce, 30 wt % La, 15 wt % Nd, and the remaining 5 wt % other rare earth metals. The particular mischmetal composition use is not critical because the aforementioned elements have similar reactivities. Thus, the chemical properties of different types of mischmetal remain essentially the same even though the contents of the individual elements may vary. Accordingly, those skilled in the art will appreciate that the primary properties of the NEG alloys of the invention do not depend upon the particular mischmetal composition that is used.

The NEG alloys of the invention may be prepared using any suitable metallurgical technique known to those skilled in the art. By way of example, the NEG alloys of the invention may be prepared by melting pieces or powders of the component metals in a furnace, where the amounts of the component metals are selected to obtain the desired composition. Preferred melting techniques include arc furnace melting in an inert gas atmosphere, e.g., under a pressure of 300 mbar of argon, and induction furnace melting in either a vacuum or inert gas. Melting typically requires temperatures above about 1000° C.

The NEG alloys of the invention may be used to produce getter devices. To produce such devices, the NEG alloys are preferably provided in powder form. The particle size of the powder is preferably smaller than about 250 μm, and more preferably in a range of from about 40 μm to about 125 μm. Particle sizes larger than about 250 μm are not preferred because they involve an excessive reduction of the specific surface (surface area per weight unit) of the material, which impairs the gas sorption properties, primarily at temperatures below about 200° C. Particle sizes smaller than about 40 μm may be used and, in fact, may be required in some applications, but are not preferred because they may cause problems in the manufacturing of getter devices.

The getter devices produced using the NEG alloys of the invention may have a variety of shapes including, for example, pellets formed solely of NEG alloy powder and NEG alloy powder disposed on a metal support. In each of these exemplary cases, the bonding of the NEG alloy powder may be carried out by compaction or by sintering. Pellets formed solely of compacted NEG alloy powder may be used, e.g., in the thermal insulation of a thermos bottle. When the powders are disposed on a metal support, the support is generally formed of a material such as, for example, steel, nickel, or a nickel alloy. The support may be in the form of a tape having the NEG alloy powder adhered on one surface thereof using known techniques. By way of example, the NEG alloy powder may be adhered on the support by cold rolling or by sintering after depositing the powder on one surface of the support using deposition techniques known to those skilled in the art. Getter devices having NEG alloy powder adhered on such tapes may be used in lamps. Alternatively, the NEG alloy powder may be disposed in a container. In this case the powder is typically compacted, however, in devices provided with a porous septum which is permeable to gas but capable of retaining the powder, loose, i.e., uncompacted, powder may be used.

Figure 2A:
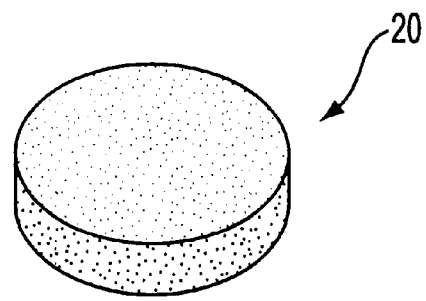
FIG. 2a shows a pellet formed of compressed NEG alloy powder of the invention.
Figure 2B:
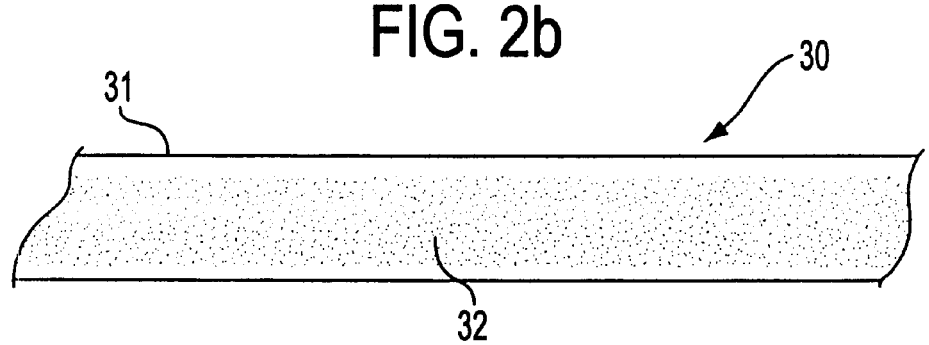
FIG. 2b shows a nonevaporable getter device including a metal tape having NEG alloy powder thereon in accordance with one embodiment of the invention.
Figure 2C:
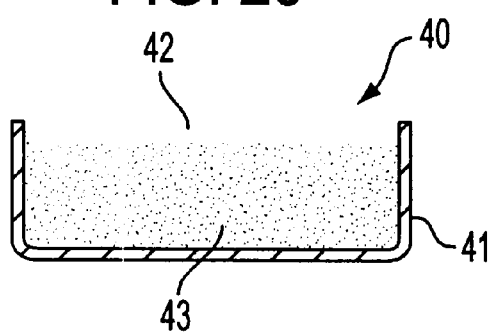
FIG. 2c is a cross-sectional view of a nonevaporable getter device including a metal container with NEG alloy powder disposed therein in accordance with another embodiment of the invention.
Figure 2D:
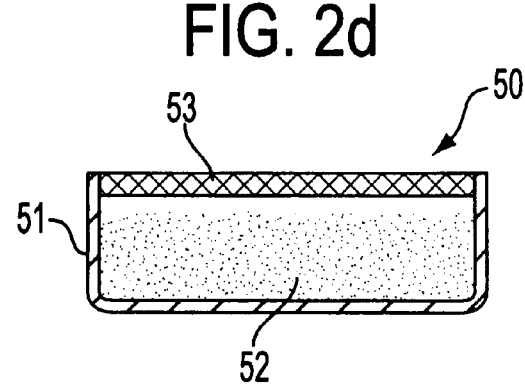
FIG. 2d is a cross-sectional view of a nonevaporable getter device including a metal container having an upper opening closed by a porous septum with NEG alloy powder disposed therein in accordance with a further embodiment of the invention

Representative embodiments of the above-described getter devices are illustrated in FIGS. 2a to 2d. FIG. 2a shows a pellet 20 formed of compacted NEG alloy powder. FIG. 2b shows getter device 30 formed of metal tape 31 having NEG alloy powder 32 disposed thereon. FIG. 2c is a cross-sectional view of getter device 40 which includes metal container 41 having upper opening 42. NEG alloy powder 43 is disposed within container 41. FIG. 2d is a cross-sectional view of getter device 50 which includes metal container 51 having NEG alloy powder 52 disposed therein. In device 50 the upper opening of container 51 is closed by porous septum 53.

As noted above, the NEG alloys of the invention are general use alloys. As such, they have a relatively low activation temperature and are capable of sorbing a number of gases. An activation treatment sufficient to render the NEG alloys of the invention functional involves heating the alloys at about 200° C. for 1–2 hours. A more complete activation treatment, which ensures higher sorption rates and capacities, involves heating the alloys at about 350° C. for approximately one hour.

Upon activation, the NEG alloys of the invention can sorb gas other than hydrogen from room temperature to the theoretical upper limit of their melting point. Generally, the maximum operating temperature of the NEG alloys is about 500° C. so as not to impair the stability and functionality of the device in which the alloys are used. At room temperature, gas sorption is limited to the grain surface and the sorption capacity is therefore limited, whereas at temperatures higher than about 300° C. the rate of diffusion of the sorbed gas molecules from the surface to the grain core is sufficient to "clean" continuously the surface, thereby improving the sorption rate and sorption capacity. The optimal operating temperature of the NEG alloys of the invention depends on the specific application for which the alloy is being used. For example, for purifying gases the optimal operating temperature ranges from about 300° C. to about 400° C.

As with all NEG materials, the sorption of hydrogen by the NEG alloys of the invention is reversible and therefore the sorption properties are estimated as hydrogen equilibrium pressure of the alloy as a function of the temperature and of the amount of sorbed hydrogen. In this regard, the hydrogen sorption of the NEG alloys of the invention is excellent. The hydrogen equilibrium pressure is lower than that for nearly all the alloys described above in the background section, with the exception of the St 101® alloy which, as noted above, requires an activation temperature of about 800° C. to about 900° C.

Another advantage of the NEG alloys of the invention is that the temperatures reached during violent reactions of such alloys, e.g., with atmospheric gases, range from about 550° C. to about 740° C., depending on the composition. On the other hand, the temperatures reached during combustion of the St 707™ alloy reach about 1200° C. Thus, even in the event that atmospheric gases, e.g., air, enter a vessel having the NEG alloys of the invention therein, such alloys do not reach their melting point or the melting point of the materials from which the walls of the vessel are generally formed, e.g., stainless steel. Consequently, even in the event of an accident, the NEG alloys of the invention are better confined and thereby the safety risk associated with the use of such alloys is reduced.

EXAMPLES

The NEG alloys of the invention will now be described in terms of specific examples. These examples illustrate preferred embodiments of the NEG alloys of the invention and are included herein to explain the principles of the invention to those skilled in the art. It is therefore to be understood that the following examples are merely illustrative and should in no way be construed as limiting the NEG alloys of the invention to any particular composition or application.

Example 1

This example involves the preparation of one NEG alloy of the invention. First, 80.8 g of zirconium powder, 14.2 g of cobalt powder, and 5.0 g of mischmetal powder were weighed. The mischmetal contained 50 wt % cerium, 30 wt % lanthanum, 15 wt % neodymium, and 5 wt % of other rare earth metals. The powders were mixed and placed in a water-cooled copper crucible of an arc furnace under an atmosphere of 300 mbar of argon. The mixture was melted by keeping the mixture at a temperature of about 2000° C. for about 5 minutes. In light of the process being carried out in an arc furnace by putting the starting materials in a water-cooled copper crucible, i.e., with a high thermal gradient (the so-called "cold earth" technique), the ingot melting was repeated four times to enhance the homogeneity of the alloy. The ingot obtained by cooling the molten mass was then ground into a powder, the powder was sieved, and the fraction of the powder having a particle size from 40 $\mu$m to 125 $\mu$m was collected. The resulting powder was then used to prepare samples for use in the tests described below. The samples were prepared by compressing 150 mg of the powder inside a ring-shaped container under a pressure of 2000 kg/cm$^2$. A thermocouple was then welded to each container to enable the measurement of the activation temperature and test temperatures of the alloys.

Example 2

This example involves the preparation of another NEG alloy of the invention. First, 83.0 g of zirconium, 14.7 g of cobalt, and 2.3 g of mischmetal were weighed. The procedures described above in Example 1 were then repeated to prepare a number of samples for testing.

Example 3

This example involves the preparation of yet another NEG alloy of the invention. First, 76.7 g of zirconium, 13.5 g of cobalt, and 9.8 g of mischmetal were weighed. The procedures described above in Example 1 were then repeated to prepare a number of samples for testing.

Comparative Example 4

This comparative example involves the preparation of the St 707™ alloy. First, 70.0 g of zirconium, 24.6 g of vanadium, and 5.4 g of iron were weighed. The procedures described above in Example 1 were then repeated to prepare a number of samples for testing.

Example 5

Figure 3:
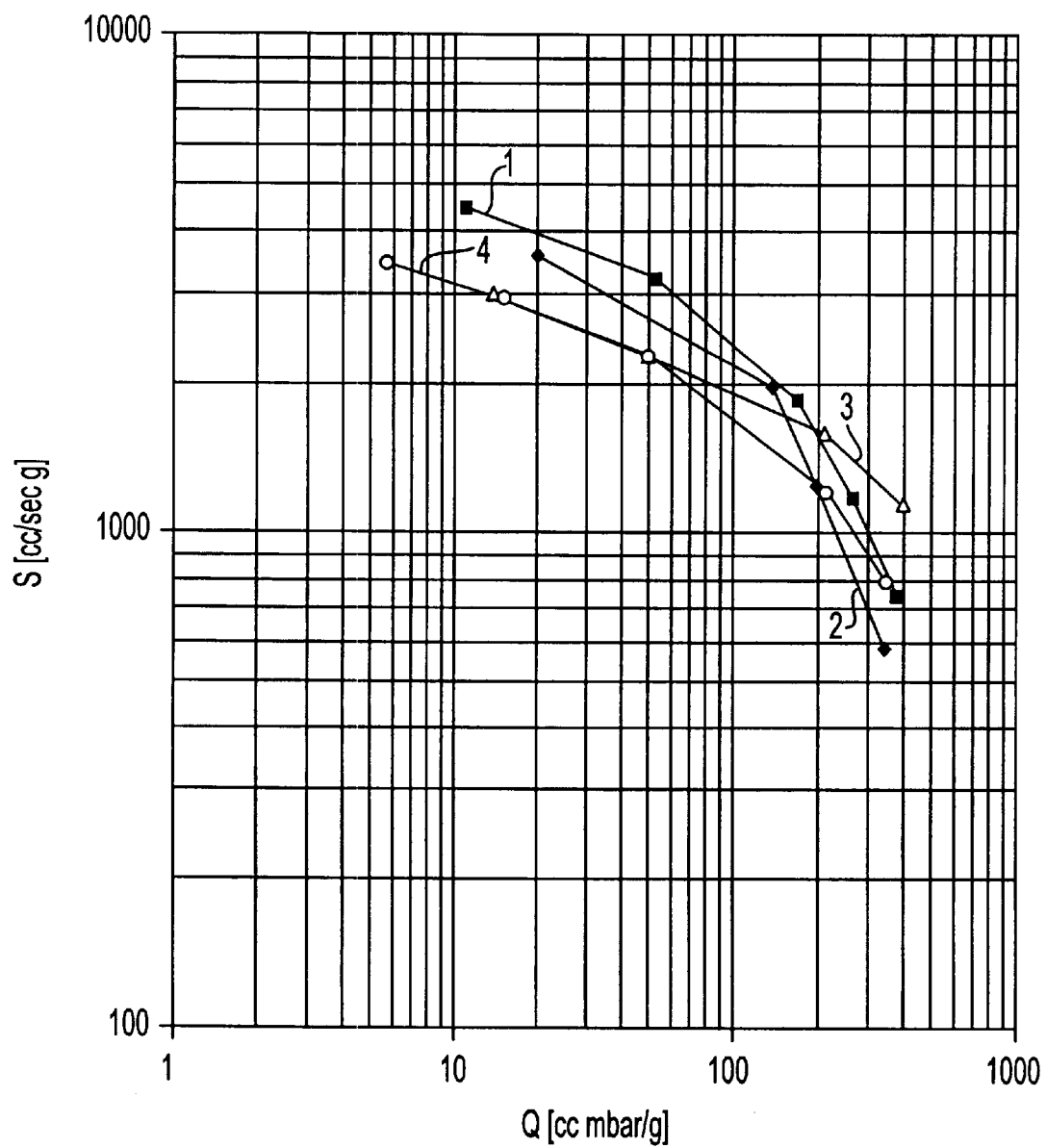
FIGS. 3 and 4 are graphs illustrating sorption rate (S) as a function of the amount of sorbed gas (Q).

A hydrogen sorption test was carried out on one of the samples for each alloy prepared in Examples 1 to 3 and Comparative Example 4. Each sample was activated at 500° C. for 10 minutes. The sorption tests were carried out in accordance with the procedure described in the standard ASTM F 798-82, by operating at room temperature and under a hydrogen pressure of 4×10$^{-5}$ mbar. The results of these tests are shown in FIG. 3 which is a graph showing sorption rate (S) as a function of sorbed gas amount (Q). The curves labeled with the numerals 1 to 4 correspond to Examples 1 to 3 and Comparative Example 4, respectively.

Example 6

Figure 4:
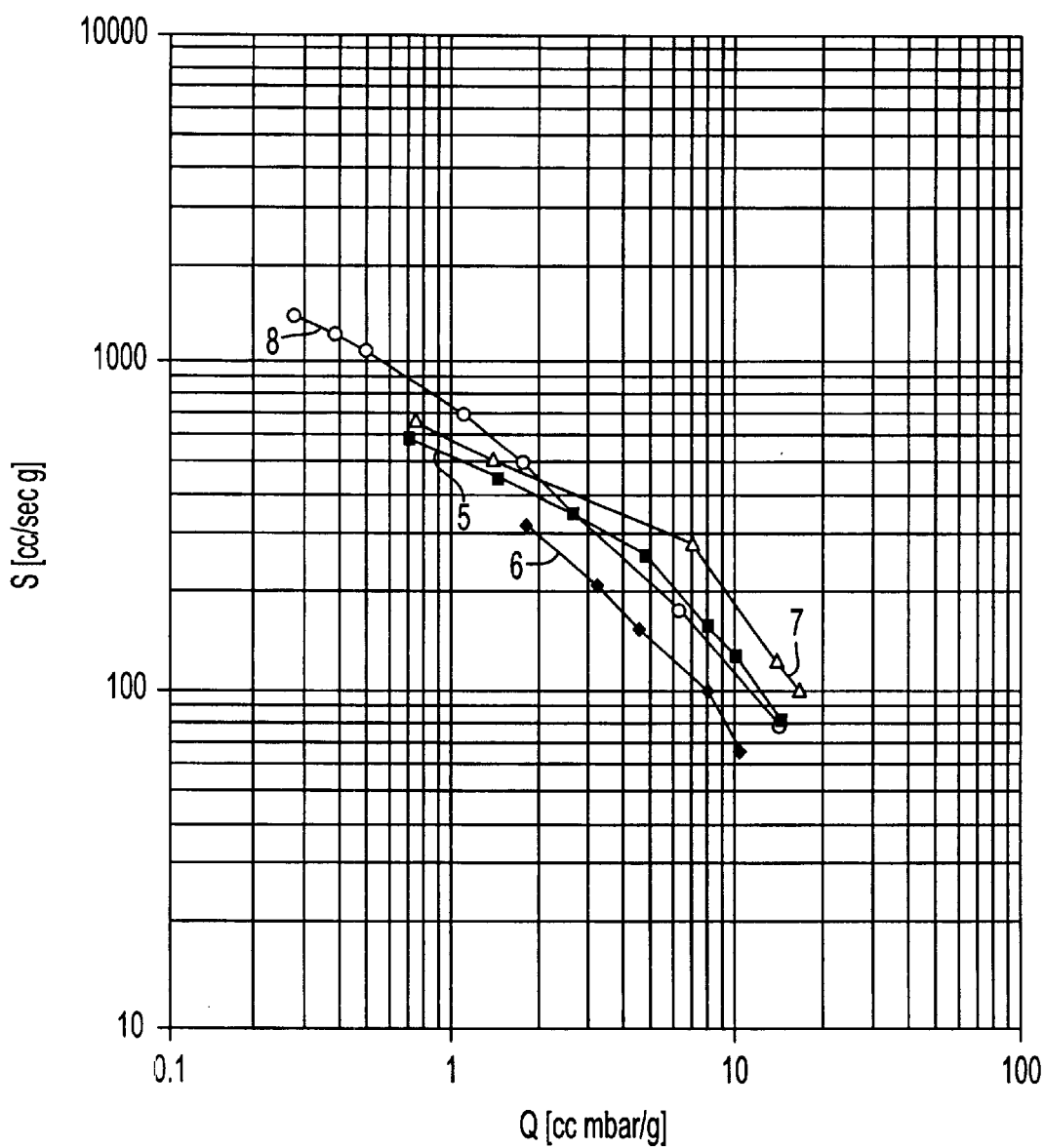

The sorption test of Example 5 was repeated using another of the samples for each alloy prepared in Examples 1 to 3 and Comparative Example 4, but using CO as the test gas. The results of these tests are shown in FIG. 4 which is a graph showing sorption rate (S) as a function of sorbed gas amount (Q). The curves labeled with the numerals 5 to 8 correspond to Examples 1 to 3 and Comparative Example 4, respectively.

Example 7

The hydrogen equilibrium pressures were measured for the three NEG alloys of the invention of Examples 1 to 3 and the St 707™ alloy of Comparative Example 4. The measuring method was similar to that used in Example 5, but in this case the bulb was not put into a furnace and the sample was heated from the outside by means of radio frequencies. Furthermore, in this case a liquid nitrogen trap was connected to the bulb to help maintain a low background pressure during the test. The system was first evacuated to a residual pressure of 10$^{-6}$ mbar. Under pumping, the sample was activated by heating with radio frequencies at 720° C. for one hour. Once the activation process had ended, the sample temperature was brought to 700° C. and the bulb was isolated from the pumping system. An exact amount of hydrogen was put into the bulb and the equilibrium pressure reached by system after 10 minutes was then measured. The sample temperature was subsequently brought to 600° C. and 500° C., and the equilibrium pressure inside the bulb was measured at these temperatures. The equilibrium pressure measurements were then repeated at the same temperatures, but in this case the test temperatures were obtained by starting from the lower temperature. This procedure was repeated for each sample introducing different amounts of hydrogen. The concentration of hydrogen sorbed by the alloys under the different test conditions was then determined based on the measured equilibrium pressures, the system volume, and the weight of the alloy.

Figure 5:
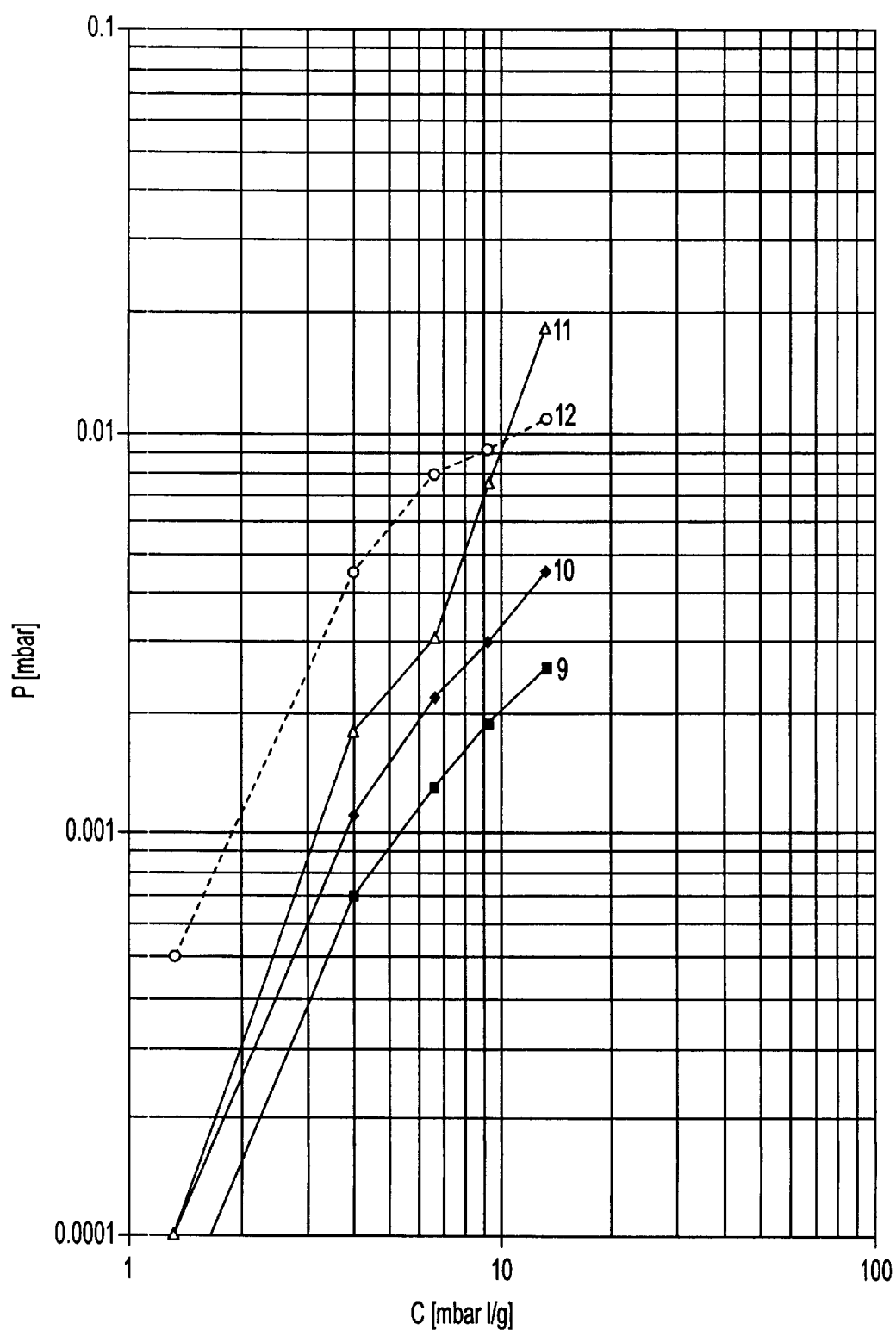
FIGS. 5–7 are graphs illustrating equilibrium pressure (P) as a function of the concentration of sorbed hydrogen (C) for samples at 500° C., 600° C., and 700° C., respectively.
Figure 6:
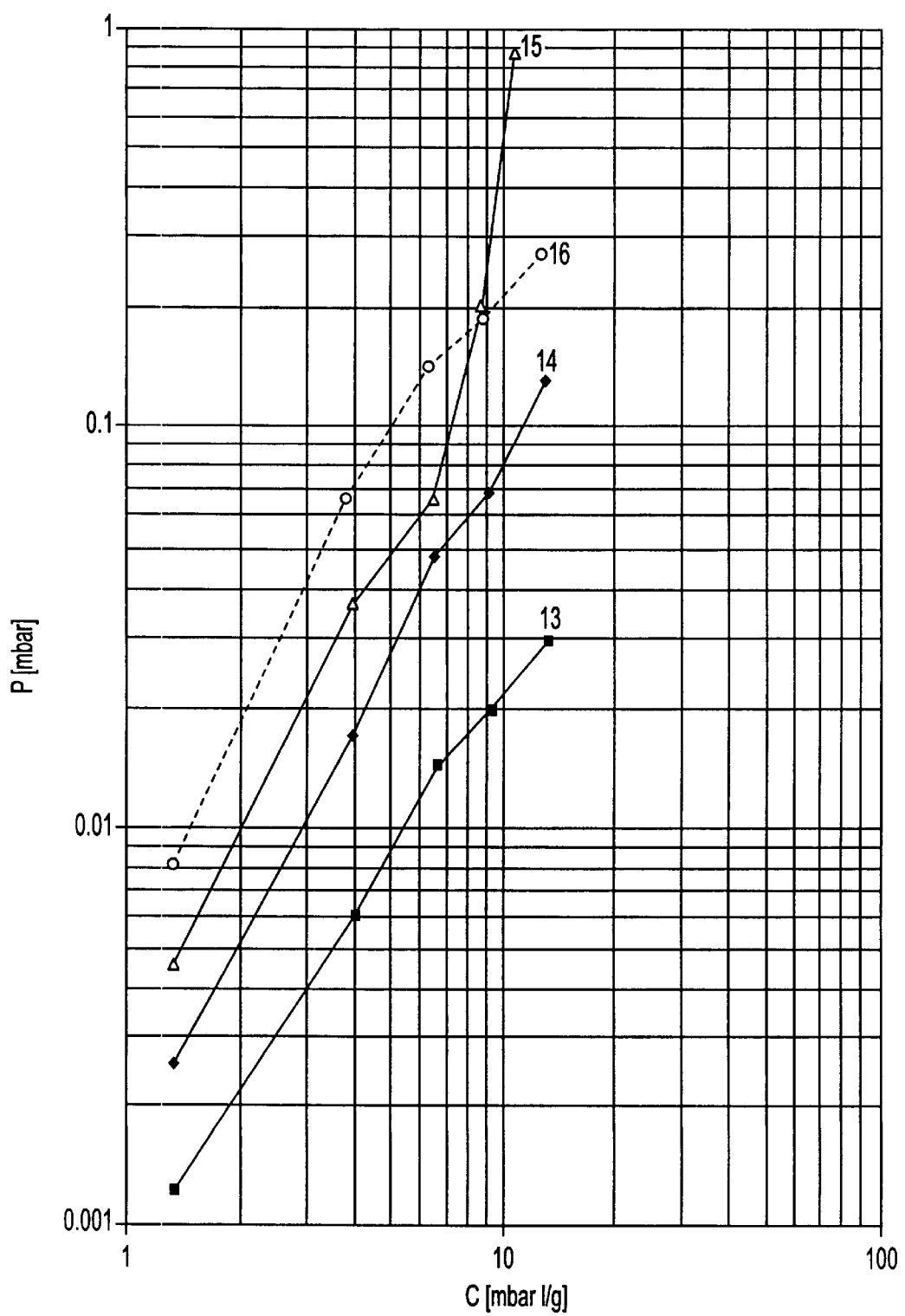
Figure 7:
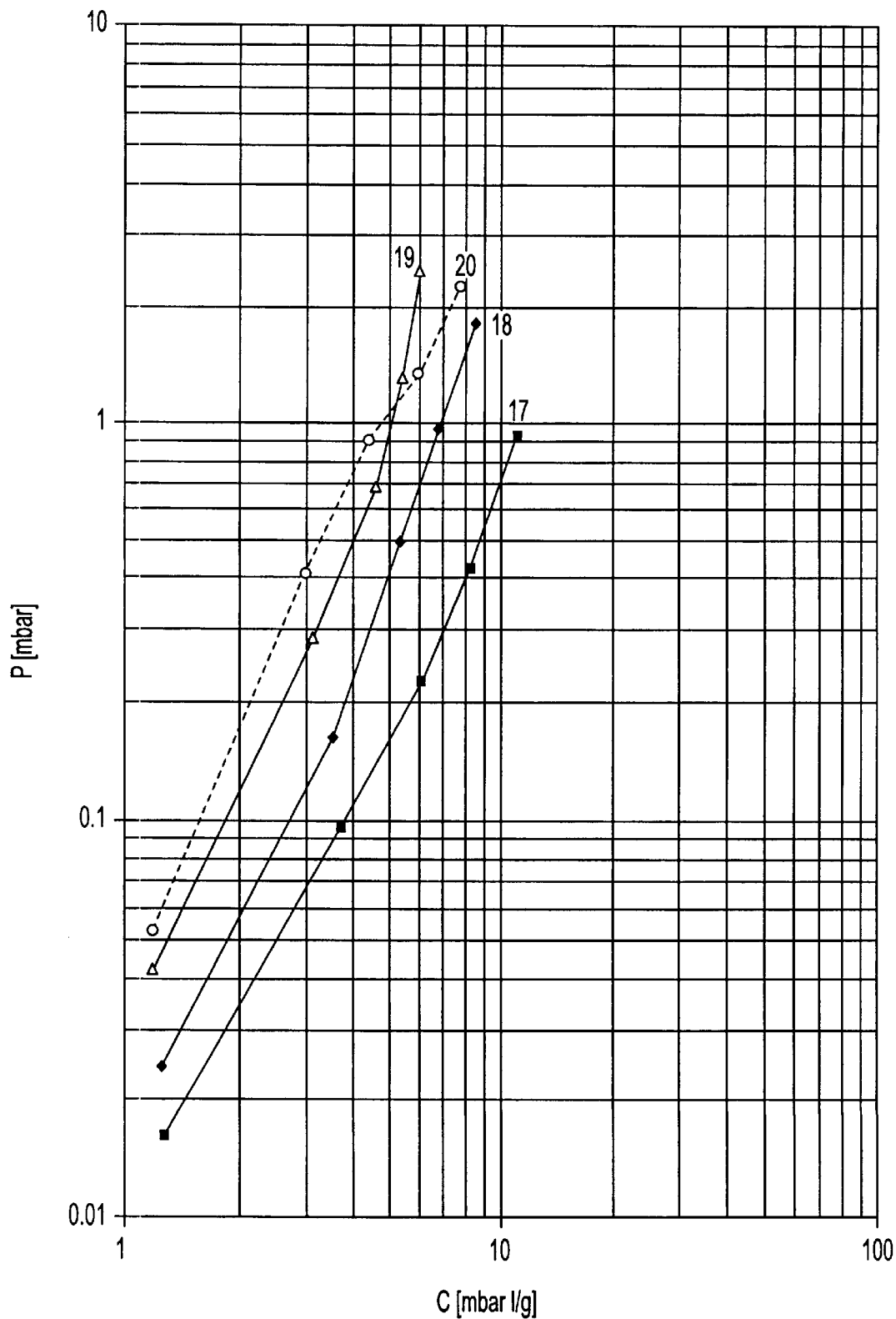

The equilibrium pressure (P) as a function of the concentration of sorbed hydrogen (C) at 500° C., 600° C., and 700° C. is graphically illustrated in FIGS. 5, 6, and 7, respectively. The curves labeled with numerals 9 to 12 in FIG. 5 correspond to Examples 1 to 3 and Comparative Example 4, respectively. The curves labeled with numerals 13 to 16 in FIG. 6 correspond to Examples 1 to 3 and Comparative Example 4, respectively. The curves labeled with numerals 17 to 20 in FIG. 7 correspond to Examples 1 to 3 and Comparative Example 4, respectively.

Example 8

This example involves measurement of the temperature reached by exemplary NEG alloys of the invention and certain known NEG alloys during combustion in air. A sample was tested for each alloy of Examples 1 to 3, Comparative Example 4, and the St 198™, St 199™, and St 101® alloys. The samples of the St 198™, St 199™, and St 101® alloys were prepared in accordance with the procedure described above in Example 1. Each sample was put into a glass bulb in contact with the atmosphere. The samples were heated with radio frequencies generated by a coil located outside the bulb with the coil having its power emission controlled by a computer which at the same time records the temperature of the sample. First, the starting temperature of combustion in air was measured for each alloy. This preliminary test was carried out by supplying the sample with linearly increasing power through radio frequencies and by monitoring the temperature trend. All samples initially show a linear temperature increase and then an upward deviation from linearity. The temperature at which this deviation from linearity occurs is considered the starting temperature of combustion in air.

The maximum temperature test was carried out by heating each sample through radio frequencies up to the previously measured starting temperature, stopping the external heating once this temperature was reached, and measuring the maximum temperature reached by the sample during the combustion. The accuracy of these measurements is ±5° C.

The test results are reported in the following Table, wherein each sample is indicated by example number (in the case of Examples 1 to 3 and Comparative Example 4) or trade name (in the case of the samples formed of the St 198™, St 199™, and St 101® alloys).

TABLE

| SAMPLE | MAXIMUM TEMPERATURE (° C.) |
|---|---|
| Example 1 | 720 |
| Example 2 | 550 |
| Example 3 | 740 |
| Comparative Example 4 | 1200 |
| St 198 ™ alloy | 750 |
| St 199 ™ alloy | 920 |
| St 101 ® alloy | >1300 |

In FIGS. 3 to 7 the sorption properties of NEG alloys of the invention are compared with those of the St 707™ alloy, which is the best general use alloy among known NEG alloys, for hydrogen and carbon monoxide. The tests were carried out on hydrogen and carbon monoxide because these gases are known to contribute to the residual pressure in evacuated chambers. As can be seen in the graphs of FIGS. 3 to 7, the NEG alloys of the invention have properties similar to those of the St 707™ alloy with respect to CO and better properties with respect to hydrogen, with the exception of the alloy of Example 3, which has maximum mischmetal content and shows an increase in equilibrium pressure at high values of sorbed hydrogen. As can be seen in the Table, the maximum temperature reached by the NEG alloys of the invention during combustion in air does not exceed about 740° C. The metal walls of a vessel can withstand such a temperature and therefore the NEG alloys of the invention can be safely confined in the event an accident occurs. As also can be seen in the Table, the maximum temperature reached by the NEG alloys of the invention during combustion is significantly lower than the maximum temperature reached by the other known NEG alloys suited for specific applications, with the exception of the St 198™ alloy which has a slightly higher maximum temperature. Thus, the known NEG alloys present a greater safety risk than the NEG alloys of the invention.

By virtue of their relatively low activation temperature and the number of gases they can sorb, the NEG alloys of the invention are suited for general use and therefore may be used in a variety of applications. For example, the NEG alloys may be used to maintain a vacuum in evacuated cavities of thermos or Dewar bottles. The NEG alloys also may be used for purifying gases, e.g., in the production of semiconductor devices. In the case of purifying gases, e.g., noble gases, for use in the production of semiconductor devices, those skilled in the art will recognize that the NEG alloys may be contacted with the gas to be purified before it is to be used, e.g., upstream of the chamber, or in the chamber in which the purified gas is to be used, e.g., a transfer chamber or a processing chamber. Furthermore, because they do not contain toxic metals and reach only relatively low temperatures in the case of combustion in air, the NEG alloys of the invention involve smaller environmental and safety risks relative to not only the St 707™ alloy, which has similar activation and gas sorption properties, but also with respect to other known NEG alloys which are suited for specific applications.

While this invention has been described in terms of several preferred embodiments, there are alterations, permutations, and equivalents which fall within the scope of this invention. It should also be noted that there are many ways of implementing the nonevaporable getter alloys and nonevaporable getter devices of the present invention. It is therefore intended that the following claims be interpreted as including all such alterations, permutations, and equivalents as fall within the true spirit and scope of the present invention.

What is claimed is:

1. A nonevaporable getter alloy comprising zirconium, cobalt, and a third component A, said alloy having a composition, in terms of weight percentage, which when plotted on a ternary composition diagram falls within a polygon defined by the points:
   a) 81 wt % Zr, 9 wt % Co, and 10 wt % A;
   b) 68 wt % Zr, 22 wt % Co, and 10 wt % A;
   c) 74 wt % Zr, 24 wt % Co, and 2 wt % A; and
   d) 88 wt % Zr, 10 wt % Co, and 2 wt % A;
   where A is selected from the group consisting of rare earth metals, yttrium, lanthanum, and mixtures thereof, said nonevaporable getter alloy having a maximum combustion temperature in air that does not exceed about 740° C.

2. The alloy of claim 1, wherein the alloy contains about 5 wt % of the component A.

3. The alloy of claim 1, wherein the component A is yttrium, lanthanum, or a mixture thereof.

4. The alloy of claim 1, wherein the component A is mischmetal.

5. A nonevaporable getter alloy consisting essentially of zirconium, cobalt, and a third component A, said alloy having a composition, in terms of weight percentage, which when plotted on a ternary composition diagram falls within a polygon defined by the points:
   a) 81 wt % Zr, 9 wt % Co, and 10 wt % A;
   b) 68 wt % Zr, 22 wt % Co, and 10 wt % A;
   c) 74 wt % Zr, 24 wt % Co, and 10 wt % A; and
   d) 88 wt % Zr, 10 wt % Co, and 10 wt % A;
   where A is selected from the group consisting of rare earth metals, yttrium, lanthanum, and mixtures thereof, said nonevaporable getter alloy having a maximum combustion temperature in air that does not exceed about 740° C.

6. The alloy of claim 5, wherein the alloy contains about 5 wt % of the component A.

7. The alloy of claim 5, wherein the component A is yttrium, lanthanum, or a mixture thereof.

8. The alloy of claim 5, wherein the component A is mischmetal.

9. A nonevaporable getter alloy comprising about 80.8 wt % Zr, about 14.2 wt % Co, and about 5 wt % A, where A is selected from the group consisting of rare earth metals, yttrium, lanthanum, and mixtures thereof, said nonevaporable getter alloy having a maximum combustion temperature in air that does not exceed about 740° C.

10. The alloy of claim 9, wherein the component A is yttrium, lanthanum, or a mixture thereof.

11. The alloy of claim 9, wherein the component A is mischmetal.

12. A nonevaporable getter alloy consisting essentially of about 80.8 wt % Zr, about 14.2 wt % Co, and about 5 wt % A, where A is selected from the group consisting of rare earth metals, yttrium, lanthanum, and mixtures thereof, said nonevaporable getter alloy having a maximum combustion temperature in air that does not exceed about 740° C.

13. The alloy of claim 12, wherein the component A is yttrium, lanthanum, or a mixture thereof.

14. The alloy of claim 12, wherein the component A is mischmetal.

15. A nonevaporable getter device comprising a nonevaporable getter alloy as defined in claim 1, wherein said alloy is in the form of a powder having a particle size smaller than 250 μm.

16. The nonevaporable getter device of claim 15, wherein the powder has a particle size in a range of from about 40 μm to about 125 μm.

17. A nonevaporable getter device comprising a nonevaporable getter alloy as defined in claim 5, wherein said alloy is in the form of a powder having a particle size smaller than 250 μm.

18. The nonevaporable getter device of claim 17, wherein the powder has a particle size in a range of from about 40 μm to about 125 μm.

19. A nonevaporable getter device comprising a nonevaporable getter alloy as defined in claim 9, wherein said alloy is in the form of a powder having a particle size smaller than 250 μm.

20. The nonevaporable getter device of claim 19, wherein the powder has a particle size in a range of from about 40 μm to about 125 μm.

21. A nonevaporable getter device comprising a nonevaporable getter alloy as defined in claim 12, wherein said alloy is in the form of a powder having a particle size smaller than 250 μm.

22. The nonevaporable getter device of claim 21, wherein the powder has a particle size in a range of from about 40 μm to about 125 μm.

* * * * *

UNITED STATES PATENT AND TRADEMARK OFFICE
CERTIFICATE OF CORRECTION

PATENT NO. : 5,961,750
DATED : October 5, 1999
INVENTOR(S) : Boffito et al.

It is certified that error appears in the above-identified patent and that said Letters Patent is hereby corrected as shown below:

ABSTRACT,
Line 2, please replace "each" with -- earth

Column 1,
Line 17, please replace "cart on" with -- carbon --
Line 18, please replace "ire" with -- are --
Line 33, please replace "disclose" with -- disclosed --

Column 2,
Line 51, please replace "coposition" with -- composition --
Line 52, please replace "n lay" with -- may --
Line 57, please delete the "("

Column 3,
Line 38, please replace "bout" with -- about --

Signed and Sealed this

Seventh Day of August, 2001

*Attest:*

NICHOLAS P. GODICI
*Attesting Officer*     *Acting Director of the United States Patent and Trademark Office*